(No Model.) 3 Sheets—Sheet 1.

A. E. D. F. DE VILLEPIGUE.
APPARATUS FOR USE IN LEVELING.

No. 417,236. Patented Dec. 17, 1889.

WITNESSES:
C. A. Dieterich.
Theo. F. Bourne.

INVENTOR:
Auguste. E. D. F de Villepigue.
By.
Brieser, Steele & Knauth
Attorneys

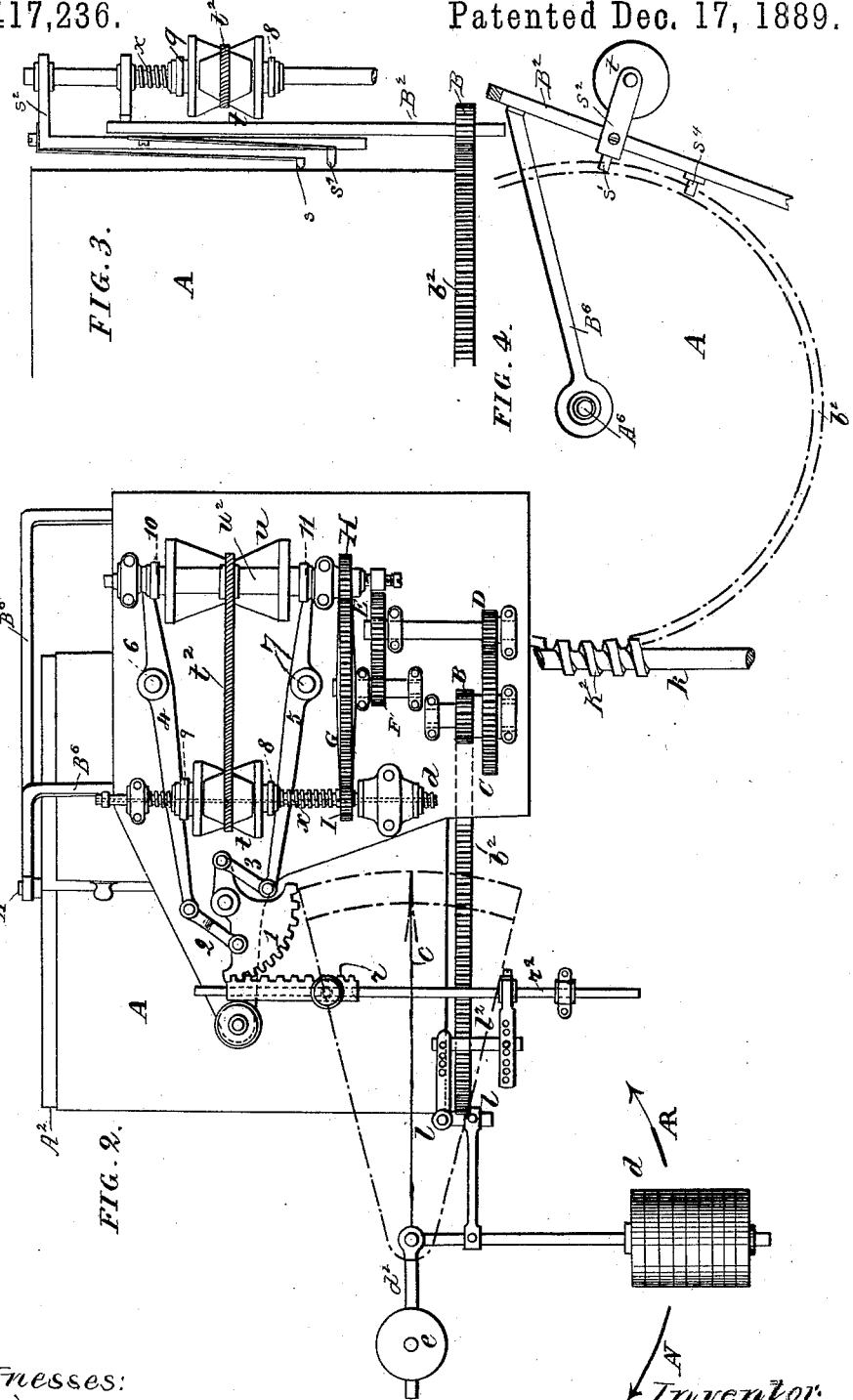

(No Model.) 3 Sheets—Sheet 3.

A. E. D. F. DE VILLEPIGUE.
APPARATUS FOR USE IN LEVELING.

No. 417,236. Patented Dec. 17, 1889.

WITNESSES:
E. A. Dieterich.
Theo. F. Bourne

INVENTOR:
Auguste E. D. F. de Villepigue.
By
Briesen, Steele & Knauth
Attorneys.

UNITED STATES PATENT OFFICE.

AUGUSTE EDOUARD DENIS FLORAN DE VILLEPIGUE, OF PARIS, FRANCE.

APPARATUS FOR USE IN LEVELING.

SPECIFICATION forming part of Letters Patent No. 417,236, dated December 17, 1889.

Application filed January 24, 1889. Serial No. 297,429. (No model.)

*To all whom it may concern:*

Be it known that I, AUGUSTE EDOUARD DENIS FLORAN DE VILLEPIGUE, of the city of Paris, France, have invented an Improved Apparatus for use in Leveling, of which the following is a full, clear, and exact description.

This invention relates to an improved apparatus for use in leveling, whereby the outline of the ground to be leveled is delineated on paper in a direct and automatic manner, the difference of level being indicated on a known scale.

Reference is to be had to the accompanying drawings, forming part of this specification, wherein—

Figure 1:
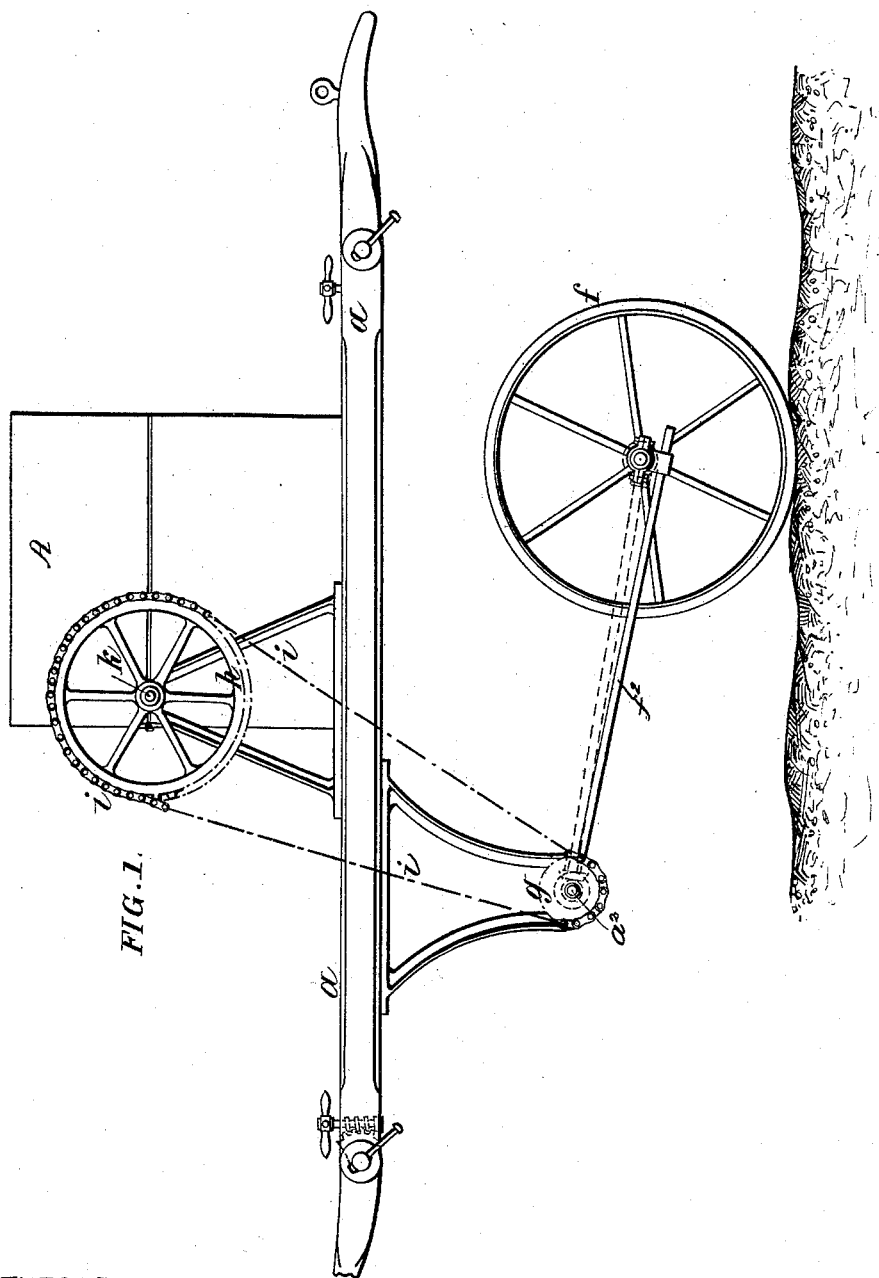
Figure 5:
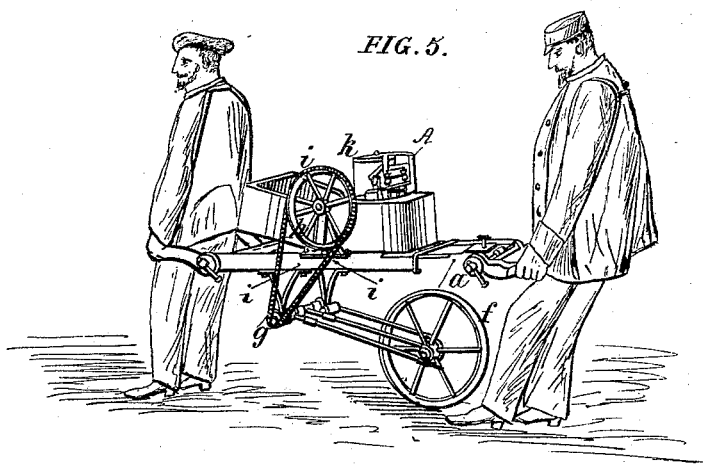
Figure 6:
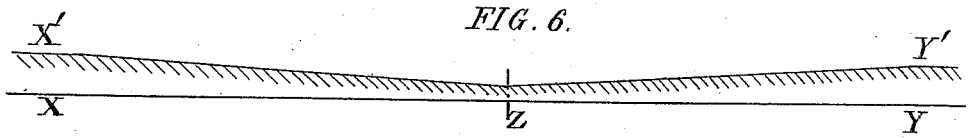

Figure 1 is a side elevation of the apparatus mounted on its barrow. Fig. 2 is an elevation, on a larger scale, of the recording or delineating mechanism. Fig. 3 is a side elevation thereof. Fig. 4 is a plan of the drum-driving mechanism. Fig. 5 is a perspective showing the mode of using the apparatus. Fig. 6 shows a diagram produced by the apparatus.

The same letters of reference indicate the same parts in all the figures.

The accidents and sinuosities of the ground to be surveyed are outlined by the apparatus upon a band of paper $A^2$, that should be secured on the upright drum A, the diagram being produced by two pencils, one $S^4$ fixed for determining the horizontal datum-line, and the other $S'$ movable and delineating the sinuosities and their relative importance to the datum-line. The mechanism is mounted on a hand-barrow $a$, suspended by yoke-straps from the shoulders of two men. This barrow is so constructed that when thus suspended it may be accurately leveled either by means of a spirit-level or by a pendulous weight $d$ and needles $c$ moving over an arc, as in dotted lines, Fig. 2. When thus leveled, the pendulous weight $d$, on whose axis is fixed the needle $c$, is vertical. Its rod has a right-angled arm $d^2$, carrying a counter-weight $e$, which, like $d$, may be adjusted by any suitable means, and which has for its object to bring it to the vertical position. Any declivity in the surface of the ground produces a motion of the pendulum in one direction or the other, which is communicated to the movable pencil, as hereinafter described. The barrow is provided with a wheel $f$, running on the ground and mounted in a frame $f^2$, free to rise and fall about the center of an intermediate wheel $g$, to which said wheel $f$ transmits rotary motion through bevel-gear $a^2$, (see dotted lines, Fig. 1,) the wheel $g$ being geared by pitch-chain $i$ with wheel $h$. The shaft $k$ of wheel $h$ has a worm $K^2$, gearing with a ring of teeth $b^2$ on pinion B, from which the parts hereinafter described derive their motion.

The oscillations of the pendulum $d$ are transmitted to a rack $r$ through the elbow-lever $l$ and connecting-links $l^2$, whose points of attachment are adjustable, as shown in Fig. 2, one of the links $l^2$ being connected with the rack $r$ or its supporting-bar $r^2$. This rack $r$ gears with a sector 1, which is coupled through links 2 3 with levers 4 5, oscillating in opposite directions on centers 6 7 and acting on the sliding collars 8 9 10 11 of expansible pulleys $t$ and $u$, whereby the ratio of the pulleys is varied. The rack $r$ and the above-mentioned connecting parts are carried on an upright or support $B^2$, that is suitably held on the apparatus, said upright $B^2$ being connected with the axis $A^6$ of the drum A by one or more arms $B^6$. (See Figs. 2 and 4.) The pencil $s$ is mounted on a bracket $s^2$, carried at the end of a screw-shaft $x$, carrying the pulley $t$, which shaft receives variable rotary motion by means of the expansion-pulleys $t$ $u$ and their driving-belt $t^2$, the pulley $u$ being driven through the train of gearing B C D E F G H and at a uniform velocity for a uniform progressive motion of the whole apparatus. The screw-shaft $x$ turns in a nut in the boss of a pinion I, which gears directly with the wheel G and turns at the same speed as the pulley $u$ and in the contrary direction to the pulley $t$, so that if the nut in the pinion I turns at the same speed as pulley $u$, and therefore as the screw $x$, their motion being opposite in direction, the one would tend to raise the screw, while the other tends to make it descend to an equal extent, so that the pencil remains at the same height above the datum-line; but if the screw $x$ turns slower or faster than the nut a differential ascending or descending motion of the pencil will be produced, as the case may be. Thus the rack $r$, by varying the ratio of the expansible pulleys, causes the pencil to ascend or descend against the rotating cylinder A, upon which paper $A^2$ is wrapped. (See Fig. 2.)

In the diagram, Fig. 6, X Y is the horizontal datum-line, ruled by the fixed pencil $s^4$, that is shown supported by the shaft $a$, (see Fig. 3,) and X' Y' the profile of the ground traveled over. From X' to Z this line is drawn on the outward and from Z to Y' on the homeward journey on the same road, the two parts of the diagram being precisely symmetrical.

The invention is not limited to the details of the mechanism above described, as these may be varied.

Having now described my invention, what I claim is—

In a traveling instrument for leveling or delineating the profile of the ground, a paper-drum driven by a traveling wheel running on the ground, in combination with a fixed pencil, a pendulous weight, an expansible pulley $u$, gearing intermediate said weight and pulley for driving the pulley, an expansible pulley $t$, a screw-shaft $x$ for said pulley, and means, substantially as described, for rotating said shaft independent of its rotation by the pulley $t$, a belt $t^2$, connecting the pulleys $t$ and $u$, and a movable pencil $s$, connected with the shaft $x$, all arranged and operating substantially as herein shown and described.

The foregoing specification of my improved apparatus for use in leveling signed by me this 29th day of December, 1888.

AUGUSTE EDOUARD DENIS
FLORAN DE VILLEPIGUE.

Witnesses:
R. J. PRESTON,
ALBERT MOREAUX.